United States Patent [19]

Benton et al.

[11] Patent Number: 5,530,811
[45] Date of Patent: Jun. 25, 1996

[54] BEHIND BACKPLANE EXPANSION BOARD APPARATUS AND METHOD

[75] Inventors: Michael K. Benton, Malvern; Anthony P. Gold, Wayne; Richard A. Schranz, Norristown, all of Pa.

[73] Assignee: Unisys Corporation, Blue Bell, Pa.

[21] Appl. No.: 207,318

[22] Filed: Mar. 7, 1994

[51] Int. Cl.⁶ .................................................. G06F 13/00
[52] U.S. Cl. ......................... 395/306; 395/311; 361/788
[58] Field of Search ................................... 395/325, 306, 395/311; 361/733, 788, 803

[56] References Cited

U.S. PATENT DOCUMENTS

| | | | |
|---|---|---|---|
| 5,327,570 | 7/1994 | Foster et al. | 395/800 |
| 5,359,714 | 10/1994 | Avaneas | 395/275 |
| 5,395,249 | 3/1995 | Reynolds et al. | 439/65 |

Primary Examiner—Jack B. Harvey
Assistant Examiner—John Travis
Attorney, Agent, or Firm—Robert R. Axenfeld; Mark T. Starr

[57] ABSTRACT

Modular expansion of a backplane is achieved by means of a modular backplane circuit board that plugs into the backplane side of a backplane parallel to that backplane. The backplane board provides a parallel backplane path between boards on the computer system. When unit boards are added to the foreplane side which require additional electrical paths for connection purposes, a modular backplane board may be added to the backplane side of the backplane to provide such path. In the preferred embodiment a gate array is added to the backplane board to provide management functions in handling the electrical connections on the backplane board.

14 Claims, 7 Drawing Sheets

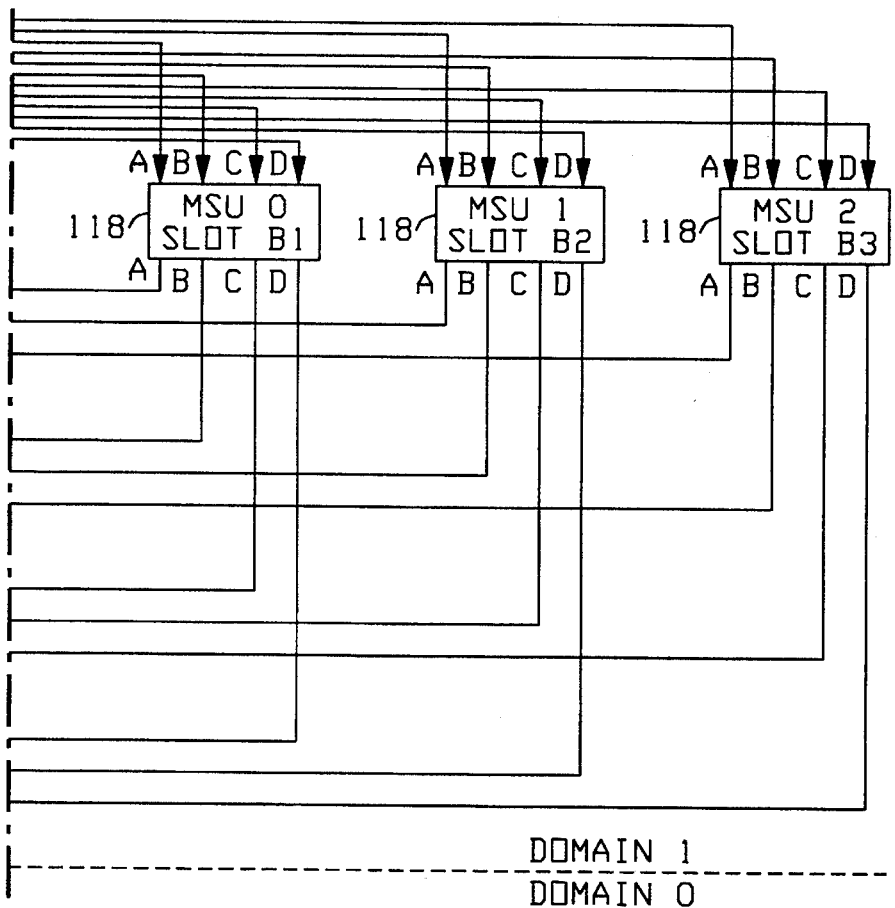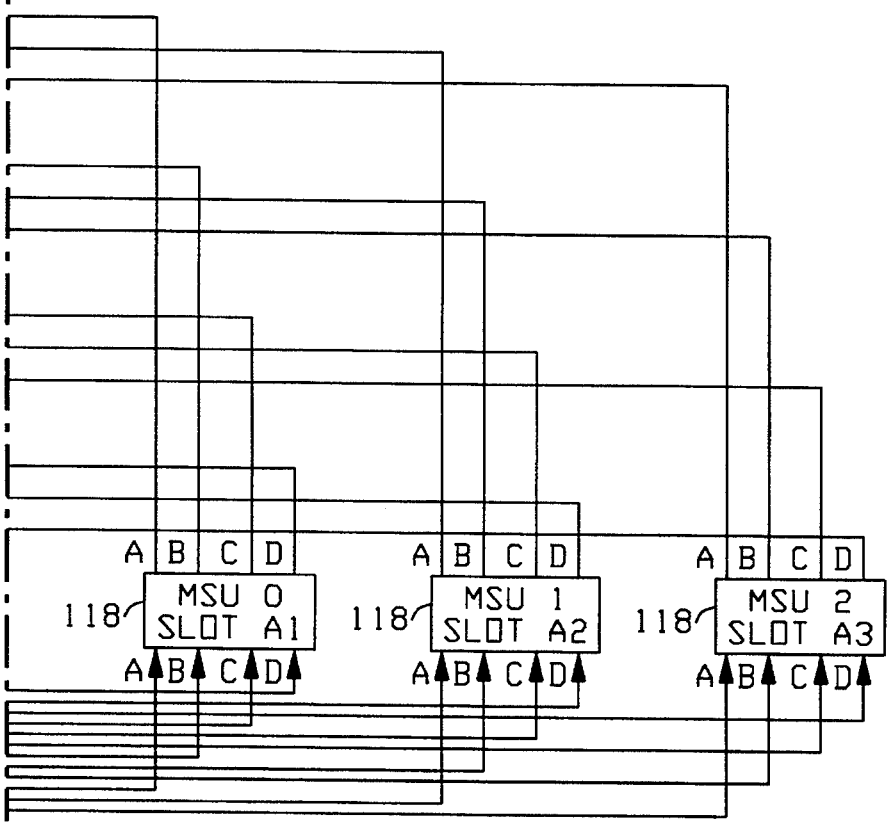
FIG 6B

BEHIND BACKPLANE EXPANSION BOARD APPARATUS AND METHOD

BACKGROUND OF THE INVENTION

1. Field of the Invention

The present invention relates generally to backplanes in computers.

2. Related Art

It is recognized in the art of computer systems engineering to construct a computer system as a series of printed circuit boards mounted on a backplane contained within a larger cabinet. Within the cabinet, cooling and power systems are typically provided, as well as means of connecting the computer system to other external systems.

In the computer engineering art, the backplane is known to be a hardware device that is the physical plane by which means a computer or similar device communicates with the units of which it is comprised. These units may include peripherals, memory, I/O interfaces, and central processor units. The backplane usually includes a series of connectors that are electrically connected to the internal wiring, or buses, of the computer system. Computer system units may then be attached to the computer by coupling compatible unit cards to one, or more, of the connectors on the backplane.

The use of a backplane as described above traditionally presents a number of constraints. Among the physical limitations of such an environment is the limitation on available surface area on the backplane to provide connections among the various units which may be attached to the backplane. For a system which may support a variety of unit configurations, the backplane must provide connections which may be required for each of the variety of unit configurations available for the computer system. This means that a large amount of the surface of the backplane may be consumed by providing connections which will only be used by a small subset of the possible configurations of the computer system. The addition of such connections also increases the complexity of the backplane in design and maintenance.

Even if there is sufficient surface on the backplane to provide the connections required, the sheer volume of the connections may make the resulting unit which must connect to the backplane so large as to be unwieldy and difficult to insert and remove. It may also make it necessary to provide a number of connectors to the backplane which is physically congested or undesirable due to the insertion force and removal force required for such a large number of pin connectors on the foreplane surface of the backplane.

There is also a physical limitation on the number of boards which will fit on the surface of a backplane in a given computer system. The increase in the size of a given unit board on the foreplane reduces the area available for other units.

It is often desirable to manage the connections between two or more units in the computer system as their signals pass through the backplane. However it is undesirable to provide such logic on the backplane itself because of the increase in complexity and maintenance problems associated with such a solution. That is, putting the logic functions necessary to manage communications between various unit boards on the system increases the complexity of the backplane and the cost thereof. Such a solution also increases the number of potential faults that may occur within a given backplane. If such a backplane fault occurs, the expense and difficulty of replacing the backplane is greatly increased because of the method chosen. It is therefore known to be desirable to keep the backplane design as simple as possible and to constrain complex functionality to unit boards which may be more conveniently replaced or added.

SUMMARY OF THE INVENTION

The present invention provides a novel solution for modular expansion of a backplane within the above constraints. This is accomplished by means of a modular backplane circuit board that plugs on to the backplane side of a backplane parallel to that backplane. For definition purposes, the side of the backplane on which the system unit boards are mounted is the foreplane side of the backplane. The backplane side of the backplane is the side opposite from the foreplane side.

The backplane board of the present invention provides a parallel backplane path between boards on the computer system. When unit boards are added to the foreplane side which require additional electrical paths for connection purposes, a modular backplane board may be added to the backplane side of the backplane to provide such path. Thus, the initial design of the backplane is simplified and additional connections may be added in a modular fashion through the use of such backplane boards.

An additional benefit which may be derived from the use of such backplane boards is that the board serves as a platform for providing additional logic functions to manage the paths in the backplane board. That is, an electrical component, such as a gate array or other logic processor, may be added to the backplane board to provide management functions in handling the electrical connections on the backplane board.

Such use of the backplane board further reduces congestion on the system unit boards as less functions need be packed onto them. This may even help reduce the number of system unit boards necessary and the density of connectors required.

In the preferred embodiment of the present invention such management functions include a means to determine the intended destination for a signal received from a given source of the connection to the backplane board. The management functions also include error detection and error handling of signals passing over the backplane board.

In the preferred embodiment, these management functions also include a means to detect when the intended recipient of a signal passing through the backplane board is not able to accept the signal. In the preferred embodiment, there is also a feature provided to queue such a signal which cannot be accepted by the intended receiver for later transmission to that receiver. The later transmission of the queued signal to the intended recipient is also performed by the gate array provided on the backplane board in the preferred embodiment of the present invention.

The environment in which the present invention is used in the preferred embodiment includes a plurality of memory ports to a memory board plugged into the foreplane side of the backplane. A plurality of requestor units to these memory ports are also plugged in to the foreplane side of the backplane. These requestor units include central processing modules (CPMs) and I/O modules (IOMs). The requestor units communicate with the memory ports through a connection in the backplane via a feed-through board which manages requests through the memory ports.

In the preferred embodiment, the use of the present invention provides a return path for responses from the memory unit ports to the given requestor units. Thus the number of paths available to provide connections between unit boards in the system is increased without increasing the complexity of the paths in the backplane itself. Requests pass through from requestor units to the memory unit without contention from the return responses which travel via a separate path through the backplane board. In this fashion the delays normally associated with a shared bus are avoided. Also sufficient connections may now be provided to permit point-to-point connectivity in the system of the present invention thus avoiding the use of a bus entirely.

BRIEF DESCRIPTION OF THE DRAWINGS

The invention will be better understood from the following detailed description when considering the accompanying drawings.

FIGS. 6, 6A and 6B are detailed drawing of the connections employed in a fully configured system in the preferred embodiment of the present invention.

DETAILED DESCRIPTION OF THE PREFERRED EMBODIMENT

Figure 1:
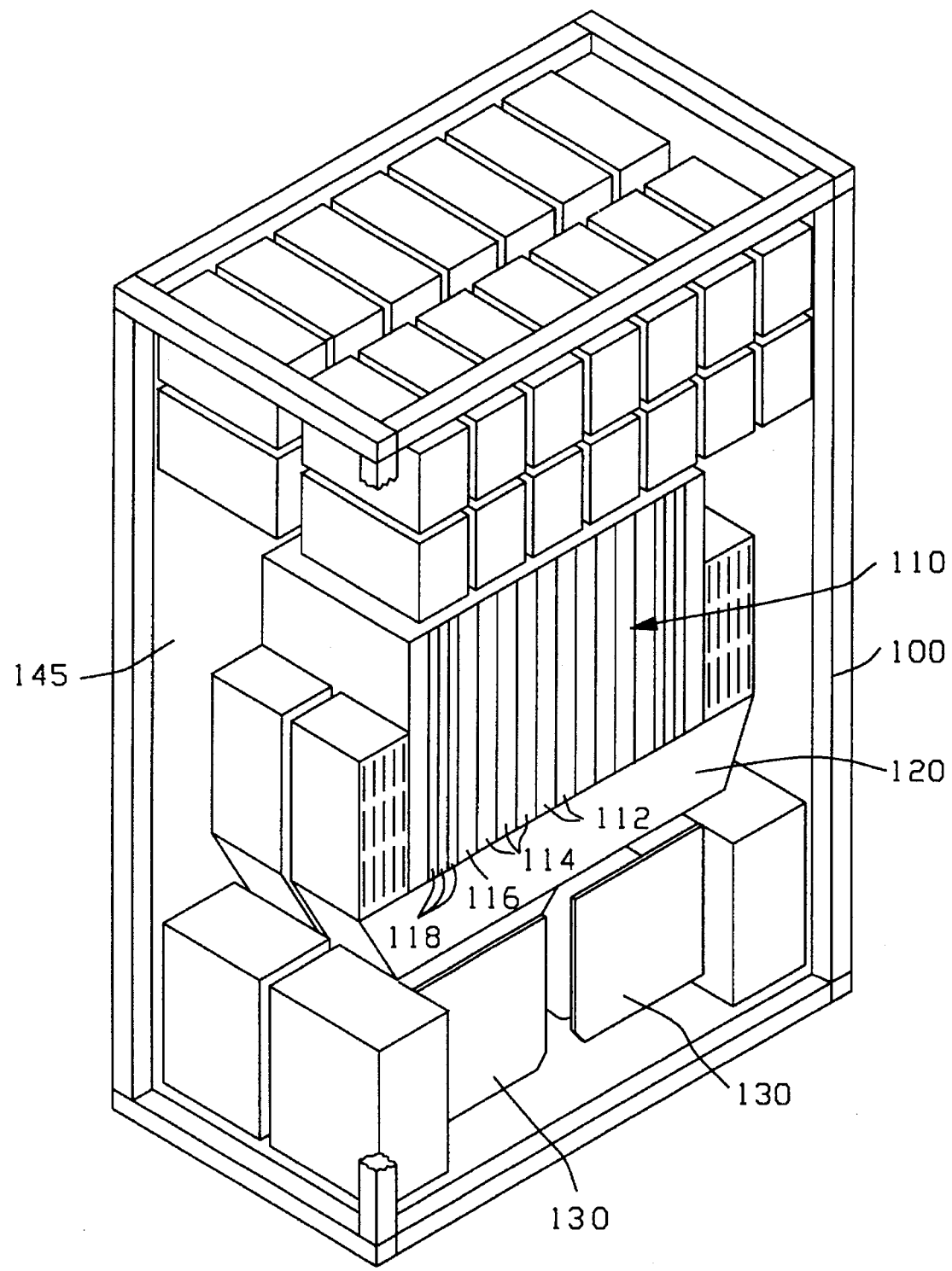
FIG. 1 is a depiction of a computer system which serves as a preferred embodiment of the present invention.

FIG. 1 depicts a computer system in which the preferred embodiment of the present invention is incorporated. A cabinet 100 is shown with the outer walls partially cut away to show the interior card rack mounting in the foreplane area of the backplane of the computer system. The system includes one or more system unit circuit cards 110 which are mounted above a plenum 120, which is coupled to a pair of blowers 130 located at the bottom of the cabinet 100. The backplane 145 is shown at the rear of the cabinet to which the circuit boards 110 connect. The figure shows a system which has a full complement of circuit boards 110 including input/output module (IOM) unit boards 112, central processing modules (CPM) unit boards 114, feed-through boards 116 and main storage unit (MSU) boards 118.

Figure 2:
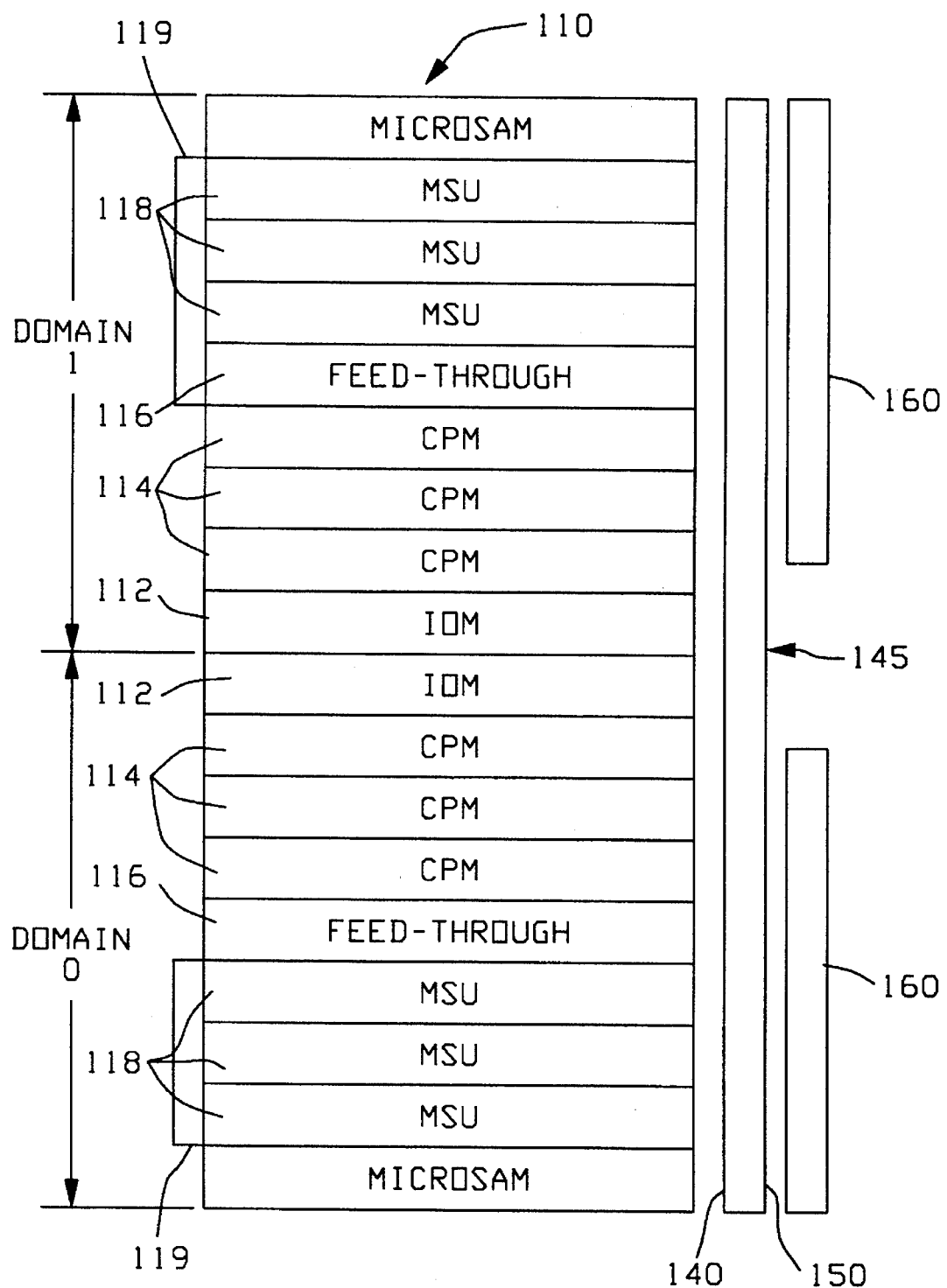
FIG. 2 is a cross-section of the backplane and the boards connected thereto in the preferred embodiment of the present invention.

Referring now to FIG. 2, there is illustrated an overview cross-section of the backplane portion of the computer system of the preferred embodiment, including the circuit boards 110, the backplane 145 and the backplane boards 160. Backplane 145 has a foreplane side 140 on which are connected a plurality of circuit boards 110. Backplane 145 also has a backplane side 150 on which are connected the backplane boards 160 of the preferred embodiment of the present invention. As illustrated in the cross-section overview, the backplane boards 160 provide an additional or alternative set of electrical connections for the circuit boards 110 to supplement the connections in the backplane 145.

In the preferred embodiment of the present invention, the circuit boards for the CPM 114 and the IOM 112 are the requestor units to the memory system. Requests from the requestor units enter the backplane 145 and travel over the electrical connections provided therein to a feed-through board 116. Feed-through board 116 performs a series of path management functions. Request signals are passed from a feed-through board 116 to MSU's 118 via foreplane jumper 119 in the preferred embodiment.

When MSU 118 responds to a request in the preferred embodiment, the response is sent via backplane board 160 through an electrical connection thereon and back to the original requestor unit CPM 114 or IOM 112.

Figure 3:
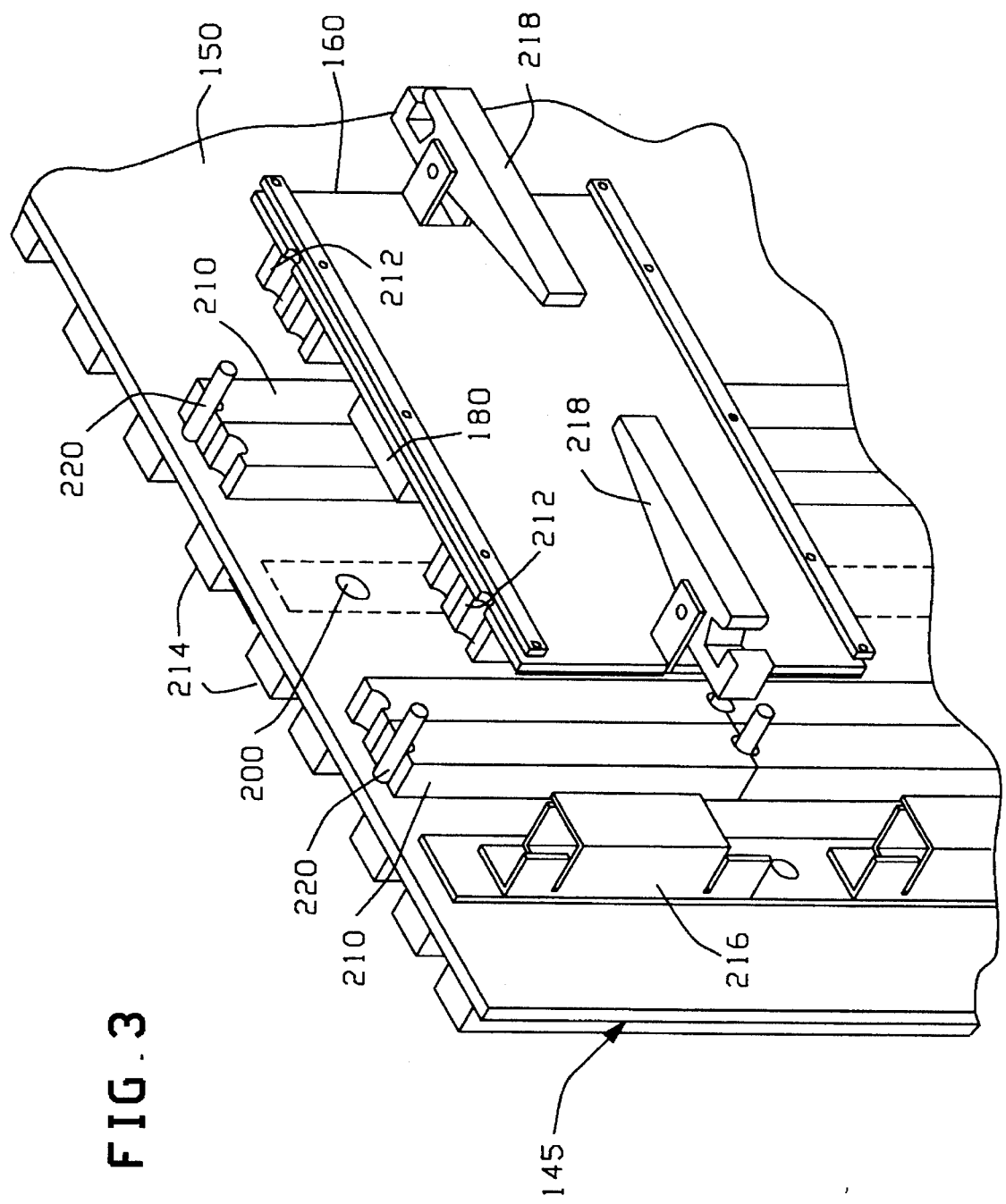
FIG. 3 is an illustration of the backplane board of the present invention shown in relation to the backplane side of the backplane in the preferred embodiment.

FIG. 3 depicts the backplane side 150 of backplane 145. Electrical connectors 210 are disposed on backplane side 150 to provide connection for backplane board 160. Backplane board 160 also has electrical connectors 212 shown in alignment with backplane connectors 210. A portion of the electrical connectors 214 for the circuit boards and the foreplane area is also shown at the top of the drawing on the foreplane side 140 of backplane 145.

In the preferred embodiment of the present invention, stiffeners 216 are also provided on backplane side 150 to improve the durability of backplane board 160. Levers 218 are coupled to backplane board 160 to facilitate insertion and removal of backplane board 160 to backplane 145. Also provided in the preferred embodiment are guide pins 220 to ensure the proper positioning of backplane board 160 when coupled to backplane connectors 210 via backplane board connectors 212.

An improvement of the present invention employed in the preferred embodiment is the inclusion of a gate array 180 on the backplane board 160 to provide management functions for the signals passing through backplane board 160. The functions provided by gate array 180 will be further described herein.

Cooling for the gate array 180 is provided via aperture 200 which is coupled to an air cooling system. Further description of the implementation of this cooling system in the preferred embodiment is disclosed in companion application U.S. patent application Ser. No. 08/157,858 entitled "THROUGH BACKPLANE IMPINGEMENT COOLING APPARATUS", filed Nov. 24, 1993.

Figure 4:
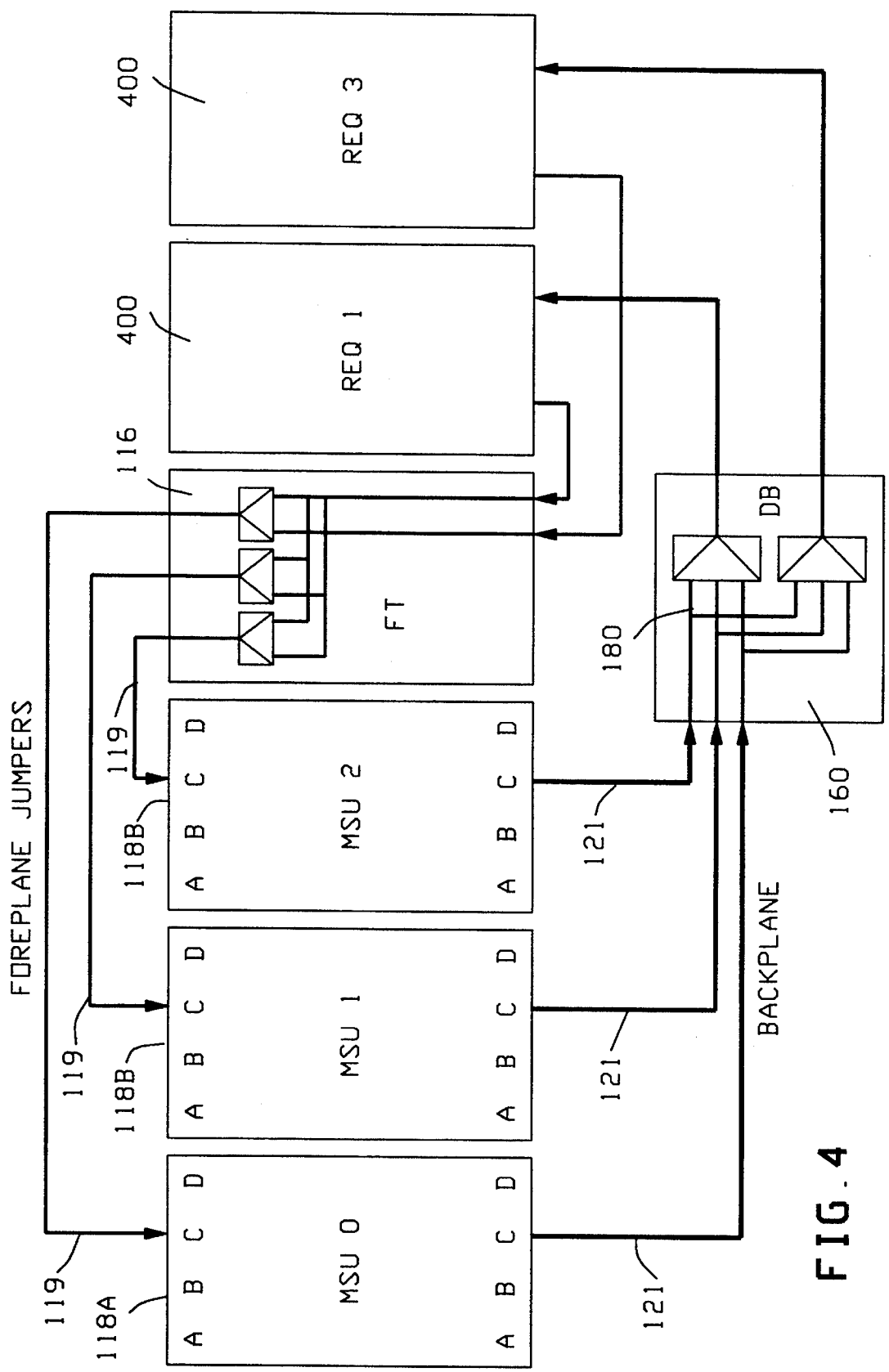
FIG. 4 is a general overview of the connections provided by the backplane board in the preferred embodiment of the present invention.

With reference now to FIG. 4, a general description of the handling of signals in the preferred embodiment of the present invention will now be provided. Two requestor units 400 are plugged into backplane 145 and are electrically connected through the backplane 145 to feed-through board 116. As previously described these requestor units may include a CPM 114 or an IOM 112 in the preferred embodiment. Feed-through board 116 manages the routing of request signals from requestor units to MSU boards 118. This routing is accomplished in a point to point manner, thus eliminating the need for a shared system bus and the associated bus management problems and delays seen in many computer system memory connections. Request signals routed out of the feed-through board 116 are delivered over foreplane jumpers 119 to the appropriate port of an MSU 118.

Since it was desirable in the preferred embodiment of the present invention to provide point-to-point connectivity between requestor units 400 and memory boards 118, it was desirable to provide a series of path out of MSU's 118 back to requestor units 400. One option was to provide such paths in the backplane 145. As has been previously described this would increase the complexity of said backplane 145.

There was also a need to provide management functions to resolve proper routing of the response signals back to the requestor unit 400 for which the response was destined. Providing such functionality in feed-through board 116 would increase the number of pins or connectors needed to couple the feed-through board 116 to backplane 145. This would increase the size of feed-through board 116 making it unwieldy to install and remove from backplane 145. It would also decrease the available space in the foreplane area of the computer system for additional requestor units 400 or memory boards 118.

As has also been previously mentioned, providing such logic functions on backplane 145 increases the complexity of the backplane 145 with a commensurate increase in cost and in difficulty to maintain. The present invention provides a plurality of electrical connections through a backplane board 160 coupled to the backplane side 150 of backplane 145. The connections 121 are managed by the functions performed by gate array 180 coupled to the backplane board 160 in the preferred embodiment.

Responses to requests are routed from the MSUs 118 out the backplane side 150 of backplane 145 into connectors 212 on backplane board 160. These responses are in the form of electrical signals which are managed by gate array 180. This management includes delivering the given response to the requestor unit 400 for which the response is destined.

In the preferred embodiment, the management functions include error detection for signals passing through the backplane board 160. When such errors are detected, the preferred embodiment provides a means for shifting the error signal through said backplane 145 and into feed-through board 116 for further evaluation or handling.

The management function provided by the gate array 180 in the preferred embodiment also includes a means to recognize when requestor unit 400 is not in a condition to receive a signal which MSU 118 has sent through backplane board 160 for that requestor unit. In the preferred embodiment, means are further provided to queue the signal for later delivery to the requestor unit 400 for which the signal is destined when that requestor unit 400 is in condition to receive the signal.

Figure 5:
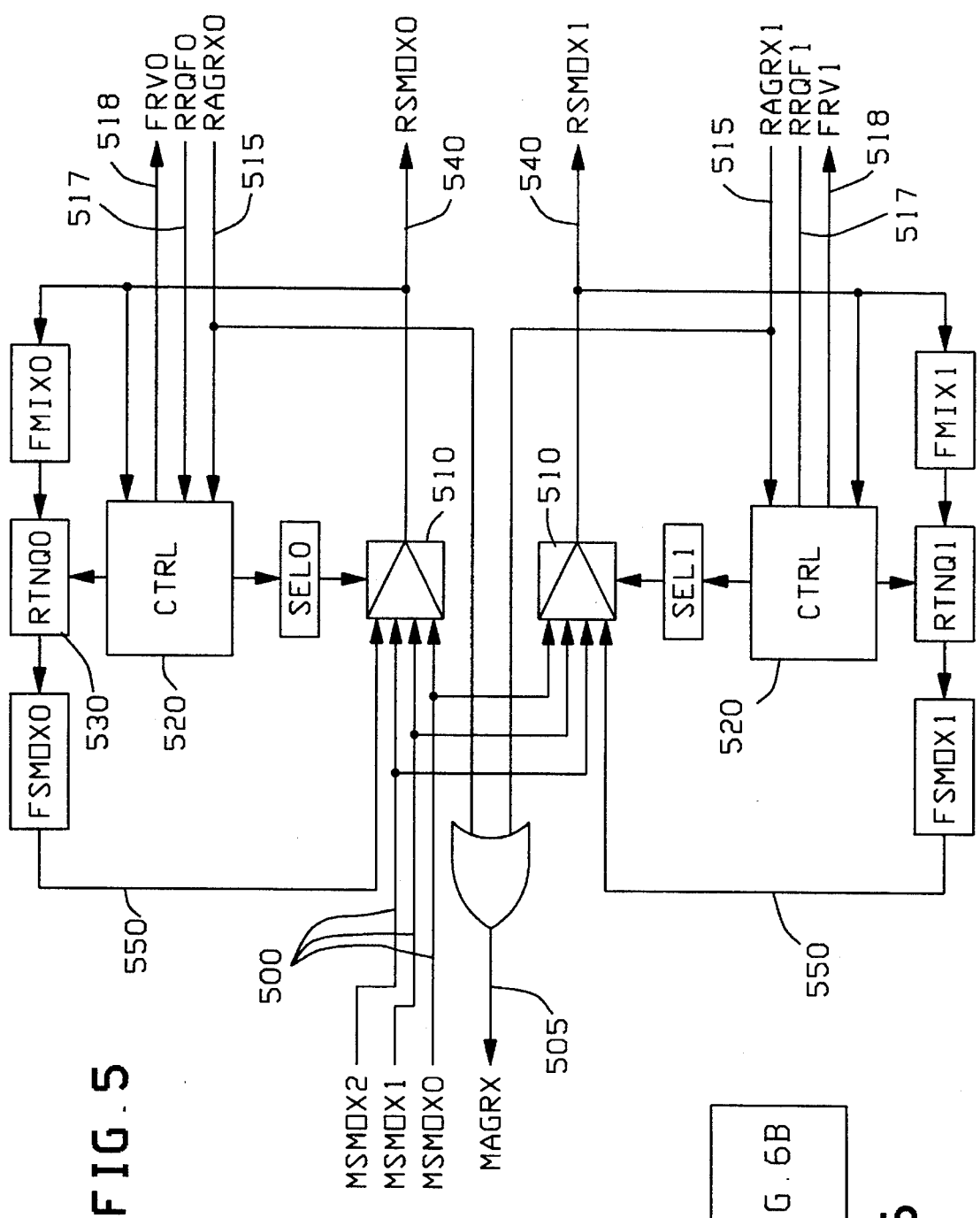
FIG. 5 is a detailed logical circuit diagram of the gate array employed on the backplane board in the preferred embodiment of the present invention.

With reference now to FIG. 5 there is shown a detailed logic diagram of the circuit which provides the functions performed by the gate array 180 on the backplane board 160 in the preferred embodiment of the present invention. MSU connections 500 enter the backplane board 160 from each of three MSUs 118. The signals enter two multiplexers 510, one for each of two requestor units 400 to which the signals from the three MSUs 118 may be destined.

Requestor unit control signals 515 enter the backplane board 160 from each of the two requestor units 400 to control circuit 520. Logic is provided in control circuit 520 to determine when requestor unit 400 is not in a condition to receive a response signal from MSU 118. A signal 517 that the requestor queue is full activates the queue extension of the present invention. The response signal is saved in the queue 530 for later transmission.

If the requestor unit 400 is in a condition to receive a response signal, the signal is multiplexed through multiplexer 510 to the appropriate requestor unit 400 via requestor input line 540.

If responses are queued in queue 530, then the disclosed invention in the preferred embodiment will make requests using signal line 518 to requestor unit 400 to deliver a queued response through multiplexer 510 via signal line 550. Such requests will appear to the requestor unit 400 as simply another request for delivery of a signal from an additional MSU. Such requests to return a response will only be activated when the RRQF signal 517 indicates that the given requestor unit is in a condition to receive such responses.

Errors detected by the gate array 180 on backplane board 160 are sent through to the feed-through board 116 as they occur during operation of the above disclosed system. The four main types of errors which may be detected in the preferred embodiment are: data parity error, protocol error, lost return, and queue full.

The first three of these are true errors. The fourth, queue full, is actually the detection of a condition which causes the backplane board 160 to initiate handling of responses through the return queue 530.

For the data parity error, control and data field parity are both checked but are not distinguished in the report to the feed-through board 116. For the protocol error, the words of the data transfer are checked to make sure that the data valid bit is set. If not then a control word has been sent when a valid data word was expected. The lost return error is reported if the queue extension 530 is full and the requestor queue is full and yet another signal requiring queuing is received from an MSU.

Thus the backplane board 160 performs a cross-bar function for the input connections 540 from the three MSUs 118 to a pair of requestor units 400. The path selection is based on monitoring the access granted signals over the RAGR line 515 from each requestor unit 400. Such access granted signals are passed from the requestor units 400 back through to the MSUs 118 via line MAGRX 505.

While the logic shown in FIG. 5 performs the function of multiplexing three MSUs to two requestor units, in the preferred embodiment a plurality of such backplane boards 160 may be employed advantageously with a plurality of MSUs 118 and requestor units 400.

Figure 6:
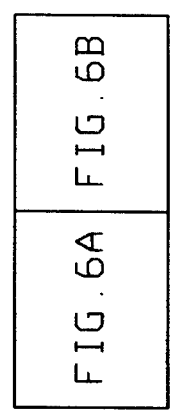
Figure 6A:
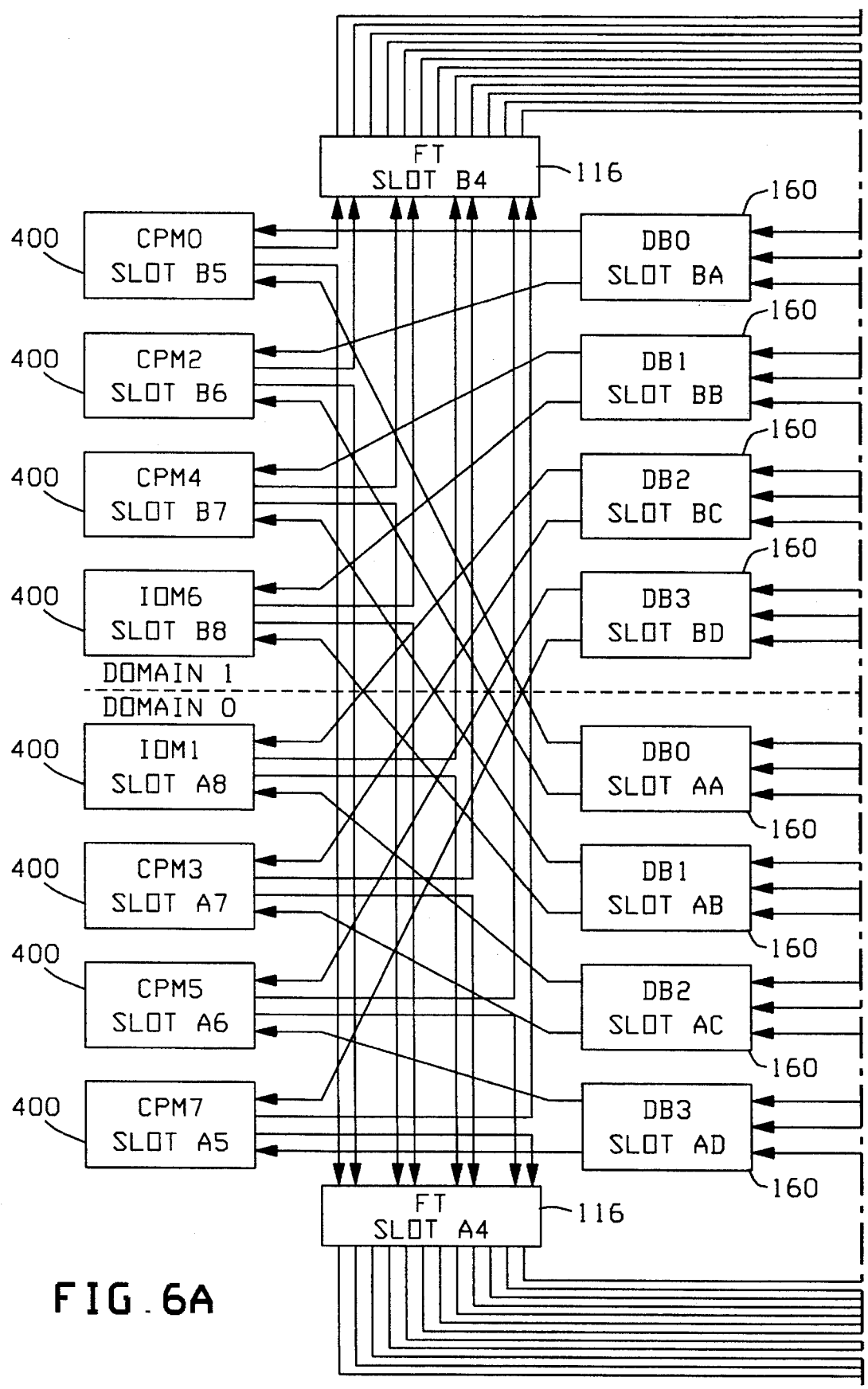

With reference now to FIGS. 6, 6A and 6B, there is shown a fully configured system in the preferred embodiment which includes six MSUs 118 and eight requestor units 400. As previously described, these requestor units may comprise CPM 114 or IOM 112. The point-to-point cross-bar connectivity is provided by feed-through boards 116 and eight backplane boards 160. Thus eight requestor units may be connected in a point-to-point fashion to six MSU's via the use of eight of the disclosed backplane boards.

Some of the many advantages of the present invention should now be readily apparent. For example, a novel system of providing a modular expansion to the paths available to circuit boards plugged into a backplane has been disclosed. This is provided through a backplane board which provides several mechanical advantages in terms of ease of installation and removal and in its size. The additional improvement of providing logic arrays on the backplane board permits management functions to be performed by the modular expansion backplane board.

The specific use of the preferred embodiment of the present invention provides point-to-point connectivity through the use of an alternate return path through the backplane board. It also takes advantage of the functionality of the feed-through board by avoiding duplication of functions provided on the feed-through board such as error handling and diagnostics. The backplane board of the present invention passes through error handling data to the foreplane board for diagnostic functions to be performed. In addition, the feed-through board on the foreplane manages the clock signals which the backplane board uses.

Obviously many modifications and variations of the present invention are now possible in light of the above teachings. It is therefore to be understood that the foregoing embodiments are presented by way of example only in that it is in the spirit of the claims attached hereto that the invention may be practiced other than as specifically described.

What is claimed:

1. An apparatus for providing an expansion to a backplane means comprising:

backplane means, including a backplane side and a foreplane side;

a first backplane electronic coupler and a second backplane electronic coupler, disposed on said backplane side of said backplane;

a first circuit board electronic coupler and a second circuit board electronic coupler, coupled to said first backplane electronic coupler and said second backplane electronic coupler respectively;

circuit board means, coupled to said first circuit board electronic coupler and said second circuit board electronic coupler, for providing a plurality of electrical connections between said first circuit board electronic coupler and said second circuit board electronic coupler.

2. The apparatus of claim 1, further comprising:

logic means, coupled to said circuit board means, for managing at least one of said plurality of electrical connections between said first circuit board electronic coupler and said second circuit board electronic coupler.

3. The apparatus of claim 2, wherein said logic means includes: overflow detection means for detecting when a signal over said one of said plurality of electrical connections will not be accepted at the receiving end of said connection.

4. The apparatus of claim 3, wherein said logic means further includes:

queuing means, responsive to said overflow detection means, for queuing a signal sent over said one of said plurality of electrical connections.

5. The apparatus of claim 4, wherein said logic means further includes:

reissue means, responsive to said overflow detection means, for reissuing said queued signal over one of said plurality of electrical connections.

6. The apparatus of claim 2, wherein said logic means includes:

error detection means for identifying the occurrence of an error on at least one of said plurality of electrical connections.

7. The apparatus of claim 2, wherein said logic means includes:

error handling means for handling an error on at least one of said plurality of electrical connections.

8. The apparatus of claim 2, wherein said logic means further includes:

destination means for delivering a signal received at said first circuit board electronic coupler over said one of said plurality of electrical connections to the appropriate destination at said second circuit board electronic coupler.

9. The apparatus of claim 1, wherein said first backplane electronic coupler is coupled to a plurality of memory ports; and said second backplane electronic couplet is coupled to a plurality of memory requestors.

10. The apparatus of claim 9, wherein said plurality of memory requestors includes a central processor unit (CPU).

11. The apparatus of claim 1, further including:

guide means to ensure the proper positioning of said circuit board means when said a first circuit board electronic coupler and a second circuit board electronic coupler are coupled to said first backplane electronic coupler and said second backplane electronic coupler respectively.

12. In a computer system, including a memory port and a plurality of memory requestors, a method of managing the communication of a response from said memory port to one of said memory requesters, comprising the steps of:

receiving a signal from said memory port;

examining said signal to determine the identity of the memory requester for which said signal is destined;

determining if said memory requestor is in a state to receive said signal;

delivering said signal to said memory requestor through a modular backplane circuit board if said memory requestor is in a state to receive said signal, where said modular backplane circuit board is coupled to a backplane side of a backplane.

13. The method of claim 12, further including the steps of:

queuing said signal if said memory requestor is not in a state to receive said signal; and reissuing said queued signal to said memory requestor when said memory requestor is in a state to receive said queued signal.

14. The method of claim 12, further including the steps of:

checking said signal for the existence of an error condition.

* * * * *